Oct. 13, 1959 R. W. CLAUSS 2,908,219
AUTOMATIC PACKAGE MARKING DEVICE
Filed July 19, 1954 4 Sheets-Sheet 2

INVENTOR.
ROBERT W. CLAUSS
BY
his ATTORNEYS

Oct. 13, 1959 — R. W. CLAUSS — 2,908,219
AUTOMATIC PACKAGE MARKING DEVICE
Filed July 19, 1954 — 4 Sheets-Sheet 3

INVENTOR.
ROBERT W. CLAUSS
BY
his ATTORNEYS.

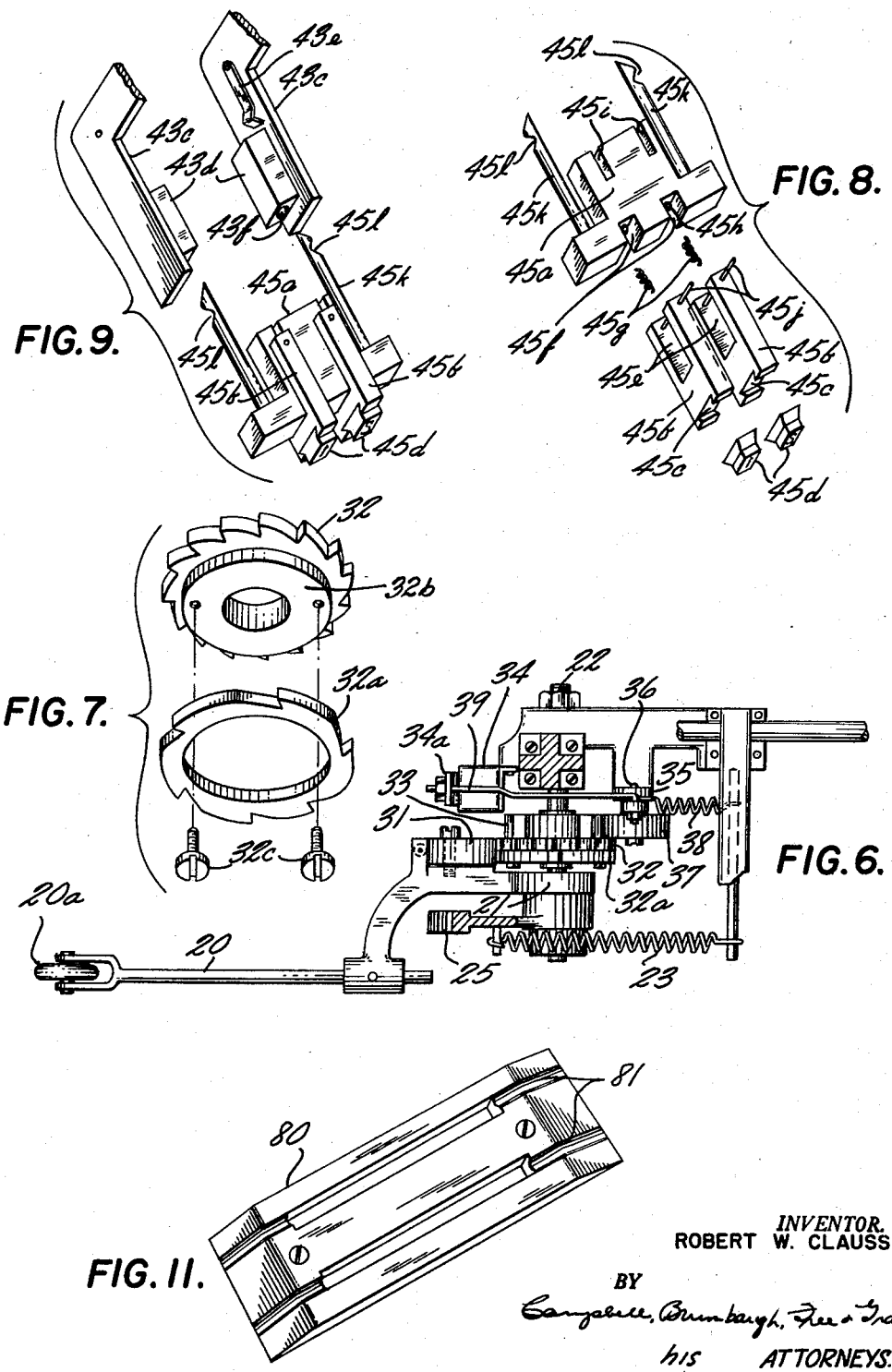

United States Patent Office 2,908,219
Patented Oct. 13, 1959

2,908,219

AUTOMATIC PACKAGE MARKING DEVICE

Robert W. Clauss, New York, N.Y., assignor, by mesne assignments, to National Dairy Products Corporation, New York, N.Y., a corporation of Delaware Application July 19, 1954, Serial No. 444,239

29 Claims. (Cl. 101—44)

This invention relates to machines for automatically marking or coding articles, such as packages, containers and the like, and particularly to a machine wherein the articles are transported on a movable conveyor or platform, delivered one at a time in orderly fashion to a printing station for the marking or coding operation, and thereafter transported away from the printing station for collection, packaging or further processing.

The printing of various indicia, such as code numbers, dates, prices and identification marks, on packages and containers has always caused troublesome inventory problems because a large stock of packages, containers or lids bearing all available indicia must be kept on hand in large supply, and if a particular indicium becomes obsolete, the entire supply is useless. Because of the reluctance to store up large inventories of packages, containers and lids, shortages frequently develop so that the packaging or container filling operations must be suspended until new supplies containing proper indicia are obtained.

The logical solution to this problem of inventory is to withhold imprinting the indicia on the packages, containers or lids, until the package or container has been filled and sealed and the desired marking or code known. However, food or foreign matter contacting the imprinting mechanism during the packaging of food and dairy products renders the indicia illegible, making this practice inadvisable.

The machine of the present invention is especially applicable to this general problem of marking or coding packages or containers after they have been filled with a food product, and it is particularly, although not necessarily, adapted to the handling of containers which are normally closed by lids.

According to the present invention, the containers are delivered to the printing mechanism by conveyors and, even though the containers are clustered thereon, they will be presented to the printing mechanism one at a time in orderly fashion by an escapement mechanism.

The escapement mechanism serves not only to meter the packages or containers to insure that they are delivered one at a time at spaced intervals to the printing station, but to actuate the means for firmly holding the package or container at the printing station prior to the marking or coding operation. The escapement mechanism includes a gate which, when in operated position, prevents the delivery of the package or container to the printing station, the package or container being maintained in registration therewith until the preceding package or container has been delivered to the printing mechanism. The gate is then released to permit the advance of the single package or container which is in the "waiting" position, that is to say, in the position of registration with the gate. Thus, if a plurality of packages or containers is received in a group, the escapement mechanism will hold them up, permitting them to advance to the printing station one at a time.

When the package or container is released and permitted to advance to the coding or marking station, it actuates a control means which initiates the operation of holding means which firmly and securely engages the container in preparation for the marking or coding operation. The holding means, in addition to preventing the further advance of the container by the conveyor during the marking or coding operation, serves to prevent any movement which may otherwise result in a smudged imprint and any tendency on the part of the container to tip over or upset, especially when it is desired to print upon the upper surface of the container substantially off center.

With the container thus properly positioned for printing, the printing head containing the desired marking or coding is moved into printing contact with the package or container. Meanwhile the control means of the escapement mechanism, after initiating the operation of the holding members and printing mechanism, re-actuates the gate to release the next container in line. Thus, as soon as the preceding printing operation has been completed and the container released by the holding mechanism, so that it continues its movement along the conveyor, another container will be presented to the printing station without delay.

As a special feature of the present invention, applicable in the case of packages or containers which are to be sealed with lids, provision is made for detecting the presence of a lid and withholding the marking operation in the absence of a lid on the package or container. Toward this end, the holding means which engages the package or container for the printing operation may also serve as the lid detecting means. Thus, if the holding means fails to engage a lid or cover on the package or container, the printing operation will be withheld to prevent the contamination of the food with the printing head, as well as to prevent the adherence of the food to the printing head.

For a complete understanding of the present invention reference may be had to the detailed description which follows and to the accompanying drawings in which:

Fig. 6 is a view taken along the line 6—6 of Fig. 1, looking in the direction of the arrows;

Fig. 7 is an isometric exploded view of certain of the parts shown in Fig. 6;

Fig. 8 is an isometric exploded view of the printing head;

Fig. 9 is an isometric exploded view of the printing head and the means for supporting the printing head;

Fig. 11 is an isometric view of the platform upon which an article or container is supported during the printing operation.

Figure 1:
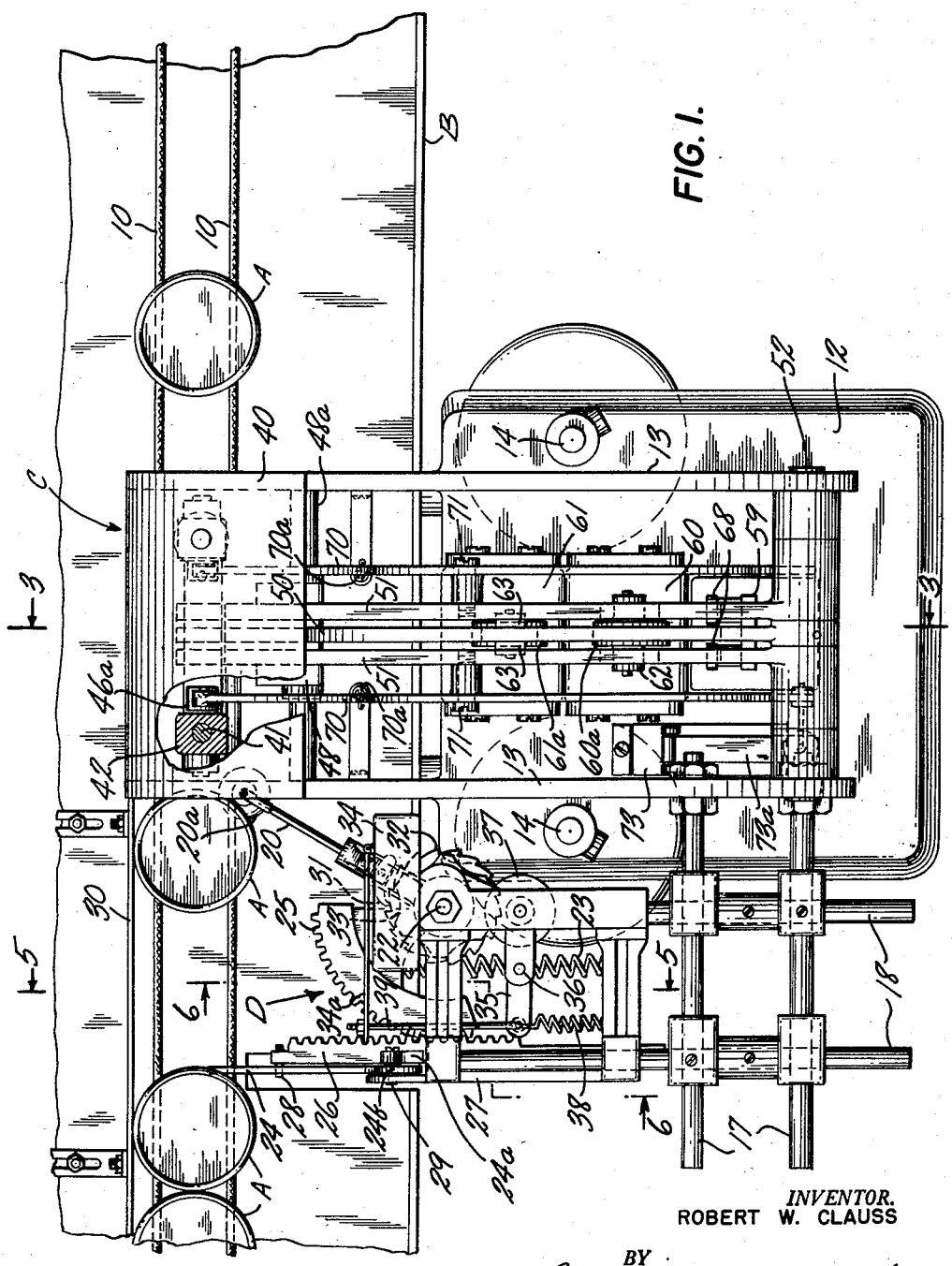
Fig. 1 is a top plan view of the present invention.
Figure 2:
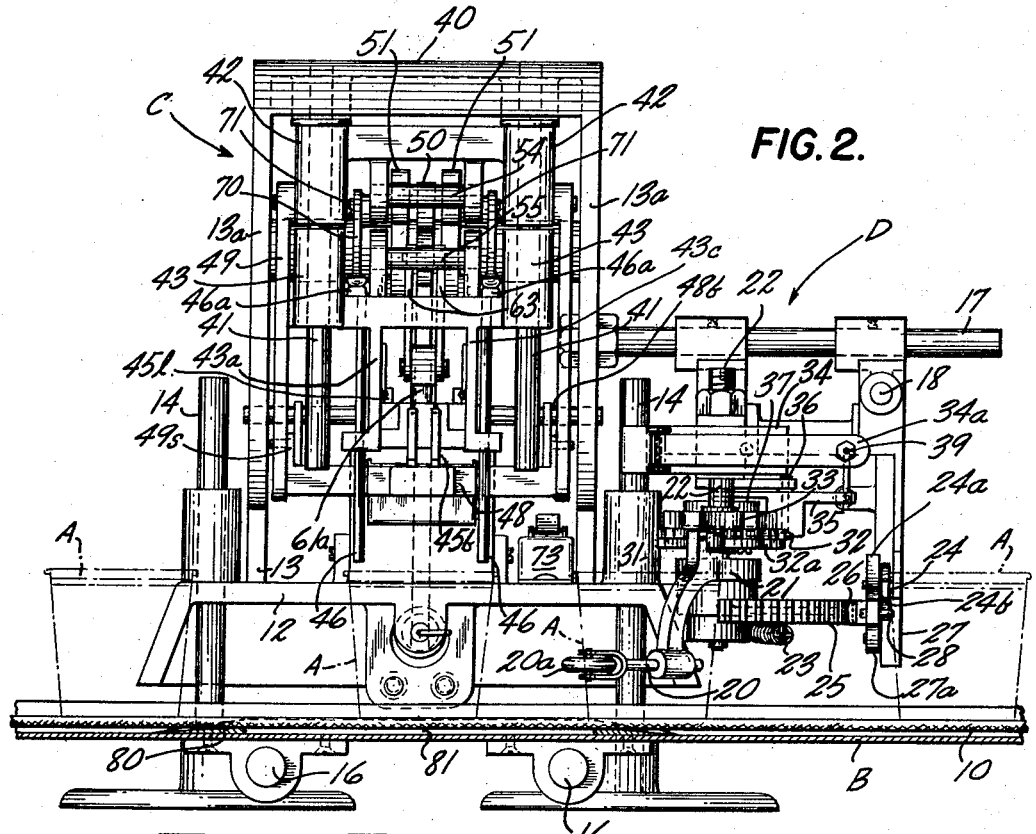
Fig. 2 is a front elevation view of the subject matter represented in Fig. 1.

Referring to the drawings, particularly Figs. 1 and 2, the packages, containers, or articles to be marked, generally represented by the reference character A, are transported to a marking or coding station by a conveyor comprising a pair of continuously moving, flexible spring members 10. The conveyor members 10 may be continuously driven, transporting the containers A across the top of a platform B. The containers, as they are transported by the conveyor to the marking or coding machine of the present invention, have already been filled and sealed with a lid or cover upon which the marking or coding is to be imprinted.

The containers A may be delivered to the conveyors 10 one behind the other without regard to the spacing between them. Referring to Figs. 1 and 2, the containers A are transported by the conveyors 10 beneath a printing unit, generally represented by the reference character C, which unit is provided with mechanism for momentarily holding the package or container against movement upon the conveyor during the printing operation, detecting the presence of a lid or cover upon the container and marking or coding the lid or cover with the desired indicia or, in the absence of a lid or cover upon the container, withholding the marking or coding operation.

The operations of the various mechanisms of the printing unit C are rendered operative by an escapement mechanism, generally represented by the reference character D, which detects the arrival of a container or article to be marked at the printing unit C. The escapement mechanism D also performs the function of insuring the presentation of the containers one at a time in orderly fashion to the printing unit C when a group or cluster of containers, too closely spaced in relation to each other, is transported by the conveyor to the printing unit. The escapement mechanism separates these clusters by arresting their movement by the conveyor and releasing them one at a time to the printing unit.

Figure 3:
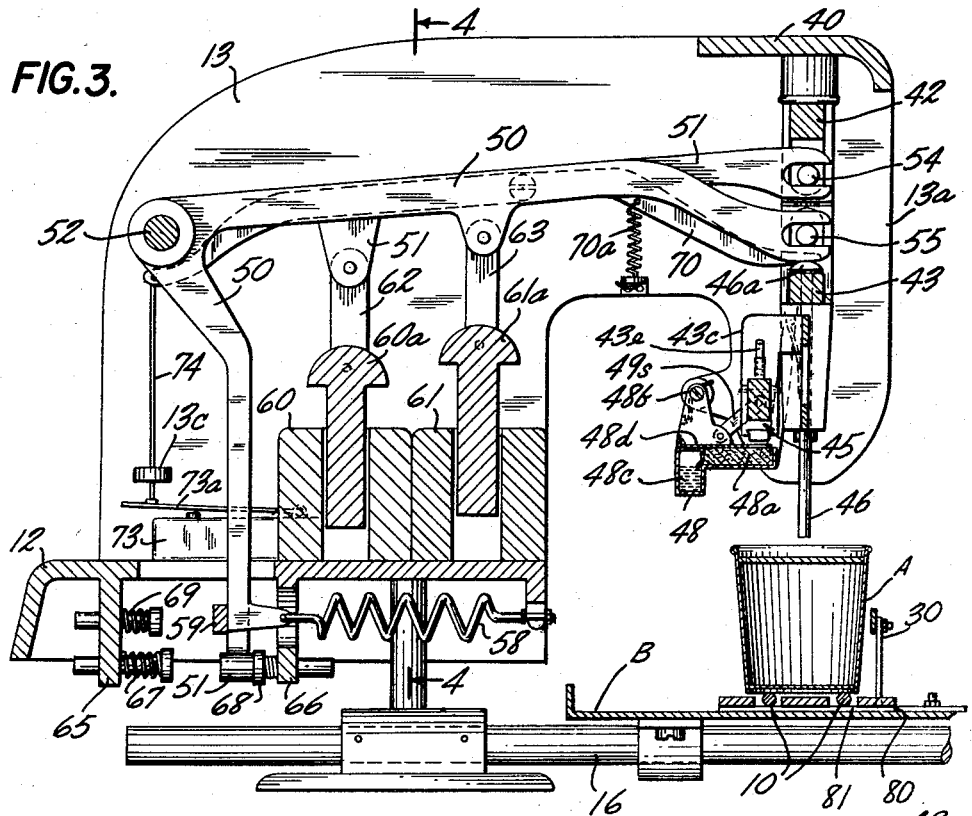
Fig. 3 is a cross-section view taken along the line 3—3 of Fig. 1, looking in the direction of the arrows, with the escapement mechanism left out.

The mechanism comprising the printing unit C is supported upon a base plate 12 and between a pair of vertical fore-and-after side frames 13. The base 12 is supported by two vertical columns 14 which permit the printing unit C to be adjusted as to height. As shown in Figs. 2 and 3, the entire machine is supported by two parallel, horizontally disposed bars 16, and the entire machine may be adjusted horizontally in a fore-and-aft direction along these supporting bars. As best shown in Fig. 3, the conveyor-supporting platform B is also supported upon the bars 16.

The escapement unit D also may be adjusted both in lateral and fore-and-aft directions with respect to the printing unit C. Toward this end the side frame 13 which is adjacent to the indexing mechanism D is provided with a pair of laterally disposed, horizontal bars 17 (see Figs. 1 and 2) which bars 17 in turn support a pair of parallel, horizontal fore-and-aft bars 18. The bars 18 support the escapement mechanism D. It is evident that the position of the escapement mechanism D may be moved in a lateral direction toward or away from the printing unit C, that is to say, in a direction parallel to the movement of the conveyor, by adjusting the position of the fore-and-aft bars 18 along the laterally disposed bars 17, and the escapement mechanism D can be moved toward or away from the conveyor by adjusting the bars 18 in a fore-and-aft direction with respect to the laterally disposed bars 17.

Referring particularly to Figs. 1 and 2, a filled container moving horizontally upon the conveyor engages a horizontal pivotal control arm 20 of the the escapement mechanism. The extreme operative end of the control arm 20 is bifurcated and carries a roller 20a. The horizontal control arm 20 is formed integrally with a collar 21 (see Figs. 2 and 6) rotatably mounted on a vertical shaft 22 of the escapement mechanism. The control arm 20 of the escapement mechanism is normally urged by any suitable means, such as by tension spring 23, to a position perpendicular to the direction of travel of the conveyor so as to be engaged by a container transported thereon. Upon engagement of a container with the control arm, the control arm is rotated in a clockwise direction, as viewed in Fig. 1, thereby moving a gate 24 into operative position to arrest the movement of a subsequent container on the conveyor. Thus, the frictional contact between the conveyor and the bottom of the container causes the control arm to rotate in a clockwise direction against the tension of the spring 23.

The movement of the gate 24 is controlled by the pivotal rotation of the control arm 20 by means of a gear segment 25 mounted to the rotatable collar 21 (see Fig. 6) and by a slidable gear rack 26 which meshes with the gear segment 25. The clockwise movement of the control arm 20 (as viewed in Fig. 1) causes the rack 26 to move forwardly, and the counterclockwise movement of the control arm causes the rack to retract rearwardly.

Figure 5:
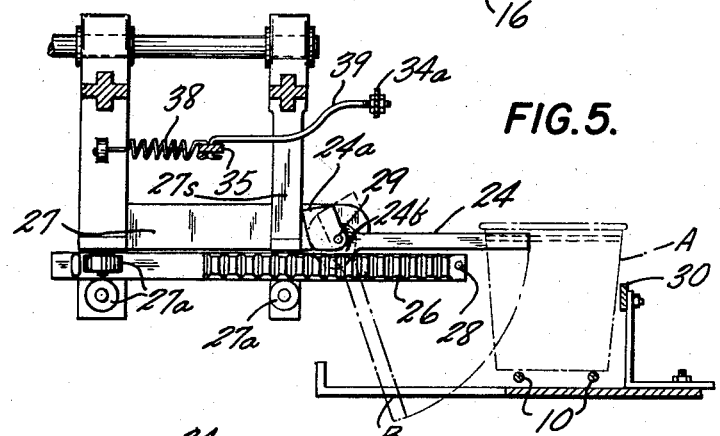
Fig. 5 is a view taken along the line 5—5 of Fig. 1, looking in the direction of the arrows.

As best shown in Fig. 5, the rack 26 is slidably mounted in a support member 27 of the escapement mechanism by rollers 27a, and the front surface of the vertical rack supporting member 27s serves as a stop for the weighted end 24a of the gate 24 when the gate is in a raised position. The gate 24 is rotatable about its pivot 29, and the weighted end 24a of the gate will normally maintain the opposite operative end of the gate raised in container-arresting position, the weight 24a of the gate engaging the front surface of the members 27s. A cam 24b is formed adjacent to and to the right of weight 24a, as viewed from the front of the machine, and the cam is provided with a downwardly disposed surface which is adapted to be engaged by horizontal pin 28 (see Fig. 2) carried at the front end of the rack 26. When the rack 26 is moved rearwardly, the pin 28 will engage the surface of the cam 24b and pivot the gate 24 downwardly to the inoperative position, represented by the phantom lines in Fig. 5, to permit the advance of a container, and when the rack is moved forwardly, the weight 24a pivots the gate arm to operative raised position.

Thus, as the container is advanced toward the printing unit C by the conveyor, the pivotal rotation of the control arm 20 moves the rack 26 forwardly toward the conveyor, thereby permitting the weighted end 24a of the arresting gate to rotate the gate arm about its pivot 29 into operative arresting position to prevent the advance of a subsequent container upon the conveyor. The container in registration with the gate 24 and any subsequent containers are held in slipping relation upon the conveyor, the guide rail 30 of the platform B maintaining the containers one behind another.

As shown in Figs. 1, 2 and 6, the collar 21 carries a spring-urged, pivotal pawl 31 thereon which makes slipping engagement with a ratchet wheel 32 mounted on the vertical shaft 22. A cam member 33 is carried directly above the ratchet wheel 32. Thus, as the container, which is about to be presented to the printing unit C, passes by the end of the control arm 20, the control arm is released and returned in a counterclockwise direction, as viewed in Fig. 1, to its original starting position by the pressure of the spring 23, the pawl 31 engaging a tooth of the ratchet wheel and rotating the ratchet wheel and the cam 33 through a predetermined arc.

This release of the control arm 20 and its subsequent return action under the influence of the spring initiates the operation of the printing unit C by closing an electrical microswitch 34. The operation of the microswitch 34 is controlled through a mechanical linkage by the cam 33. A transversely disposed lever 35 mounted about a center pivot 36 carries a wheel 37 at one end thereof which engages the periphery of the cam 33. As shown in Figs. 1, 5 and 6, the other end of the lever 35 is acted upon by a spring 38 which maintains the wheel 37 in contact with the periphery of the cam 33. The same end of the lever 35 is connected by means of a fore-and-aft link 39 to the contact arm 34a of the microswitch 34. At the beginning of the pivotal movement of the control arm 20 by the advance of a container along the conveyor, the wheel 37 is adapted to seat in a depression of the cam 33, and when the lever 35 is in its position, the microswitch 34 is open. However, when the container about to be presented to the printing unit C passes by the end of the control arm 20, thereby releasing it and permitting it to rotate the ratchet wheel 32 and cam 33 through a given angle, the cam 33 is rotated so that the wheel 37 of the lever 35 is engaged first by a raised portion of the cam, thereby closing the switch 34, and then by another depression of the cam to re-open the switch 34, the marking operation taking place while the switch 34 is closed.

As the control arm 20 is being spring-returned to its starting position where it will be engaged by the next container in line, the segment 25 slides the rack 26 in a rearward direction, causing the pin 28 to engage the cam 24b of the gate 24 to pivot the arresting gate downward to inoperative position. This pivotal movement of the arresting gate releases the next container in line and permits the conveyor 10 to carry it forward into engagement with the control arm 20 to repeat the cycle. Of course, as soon as the container carries the pivotal arm 20 through a given portion of its arc, the arresting gate 24 is again raised to intercept the succeeding container in line.

As best shown in Figs. 6 and 7, a notched collar 32a is adjustably mounted by screws 32c to an annular hub 32b formed integrally on the bottom surface of the ratchet wheel 32. The diameter of the collar is equal to or greater than the major diameter of the ratchet wheel, and the collar normally prevents the pawl 31 from engaging the ratchet wheel. The collar 32a has, however, a few notches around its periphery, and during the return stroke of the control arm 20, the point at which the pawl engages the ratchet wheel will be determined by the adjusted position of the first encountered notch of the collar. Thus, regardless of the diameter of the container and the arc through which the control arm is pivoted, the rotation of the cam 33 can be maintained constant.

Referring to Fig. 3, the upper and front ends of the side frames 13 of the printing unit C extend forward above the conveyor 10, forming side walls 13a. The upper ends of these walls 13a are connected by a cross member 40 which forms the roof of the printing unit. The cross member 40 supports two downwardly depending, vertical guide shafts 41 which provide vertical guides for an upper reciprocable carriage 42 and a lower reciprocable carriage 43 (see Figs. 2 and 3).

The lower carriage 43 is provided with a pair of downwardly projecting posts 43a formed integrally therewith, each of the posts 43a carrying therein a vertically slidable rod or holding member 46 having a head 46a at the upper end thereof by means of which the holding member is supported by the frame 43. If desired, the container holding rods 46 may be spring urged to their lowermost positions either by springs within the posts 43a, or by means of springs 70a (Fig. 3) acting through levers 70, whose action will be described below. A printing head 45 carrying typographical characters corresponding to the marking or code to be imprinted upon the container is mounted to the lower carriage 43 between the posts 43a.

The printing head 45, as shown in Figs. 8 and 9, comprises a block 45a, having an inverted T shape, and a plurality of individual type holders 45b which are provided with dove-tail notches 45c to accommodate the dove-tail bases of the typographical characters 45d. The upper ends of the holders 45d have deep slots 45e which interlock with slots 45f formed in the lower edge of the block 45a. Small springs 45g are inserted in holes 45h of the block, above the slots 45f, and the springs allow the holders 45b to yield slightly in relation to the block 45a. The upper edge of the block 45a is provided with slots 45i which accommodate pins 45j extending across the slots 45e of the holders, the pins normally engaging the bottom of the slots 45i under the compression force of the springs 45g. The type holders 45b are, therefore, upwardly yieldable when the printing head is lowered into printing contact with the article or container to be marked, thereby permitting them to make good printing contact with the surface to be printed, even when printing on curved or uneven surfaces.

The block 45a of the printing head carries two upwardly projecting blades or prongs 45k, each having a notch 45l in the upper end thereof, the notch of one of the prongs 45k being forwardly disposed and the notch of the other being rearwardly disposed. The prongs 45k are adapted to be locked to and between a pair of supporting arms 43c of the lower carriage 43. The arms each carry a block 43d having a vertical guide hole 43f formed therein, and a spring-locking member 43e above the upper end of the block 43d, the arrangement being such that the prongs 45k of the block 45a may be inserted through the holes 43f and the notches 45l engaged and locked by the spring members 43e.

Figure 10:
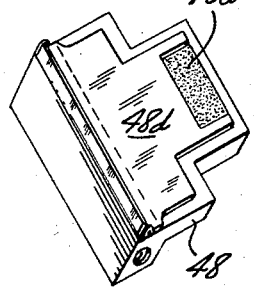
Fig. 10 is an isometric view of the inking pad and holder therefor.

As best shown in Figs. 2, 3 and 10, an inking device 48 which is adapted to apply ink to the characters of the printing head 45, is pivotally mounted as at 48b between the side walls 13a of the printing device. The inking device 48 comprises a housing containing an ink pad 48a, an ink reservoir 48c communicating with the ink pad, and a cover plate 48d having an opening in the front end to provide access to permit the type characters to engage the ink pad. The inking device 48 is normally urged to maintain the inking pad 48a in inking contact with the typographical characters of the printing head 45 by two pivotal links 49s (Fig. 2) connected to the two downwardly extending upper carriage arms 49, the arrangement being such that as the upper carriage 42 descends, the inking pad 48 will be pivoted by the links 49s in a clockwise direction, as shown in Fig. 3, out of the way of the vertical descent of the printing head 45, and when the upper carirage 42 travels upwardly, the pivotal links pull the inking pad upward into contact with the printing head. This periodic pivotal movement of the inking device is utilized to convey the ink from the reservoir to the ink pad so that the surface of the pad is constantly remoistened.

The descent of the upper and lower carriages 42, 43 causes the downwardly projecting container holding members 46 to engage the lid or cover of the package or container to be marked or coded, and by means of the spring pressure applied to the holding members, the package or container is firmly and securely held in the printing position. The further downward travel of the lower carriage 43 alone brings the printing head 45 into engagement with the upper surface of the container, thereby imprinting the desired marking or code upon the lid of the container. As explained above, the typographical characters are resiliently supported in the printing head 45 to provide the proper pressure for printing, as well as to permit limited pivotal movement to the printing head to facilitate printing upon curved, slanted or uneven surfaces.

The upward and downward movements of the upper and lower carriages 42, 43 are controlled by three substantially L-shaped levers arranged side by side, the center lever 50 of the three controlling the movement of the lower carriage and the other two levers, one on each side of the lever 50, both represented by the reference symbol 51, controlling the movement of the upper carriage. All three levers are pivotally mounted on a transverse shaft 52 extending between the side frames 13 at the rear of the printing unit. As shown in Figs. 2 and 3, the extreme front end of the lever 50 is forked or split to engage a transverse bar 55 of the lower carriage, and the front ends of the levers 51 are also forked or split to engage a horizontal bar 54 of the upper carriage. As best shown in Fig. 3, the upper and lower carriages 42, 43 are normally maintained in their uppermost positions by horizontally disposed tension spring 58 housed beneath the base plate 12. The spring 58 is attached directly to the lower end of the central lever 50, and the counterclockwise pressure (as viewed in Fig. 3) exerted by the spring upon the lever 50 is transmitted to the levers 51 by a transverse plate or yoke 59 attached to the rear edge of the lever 50.

Figure 4:
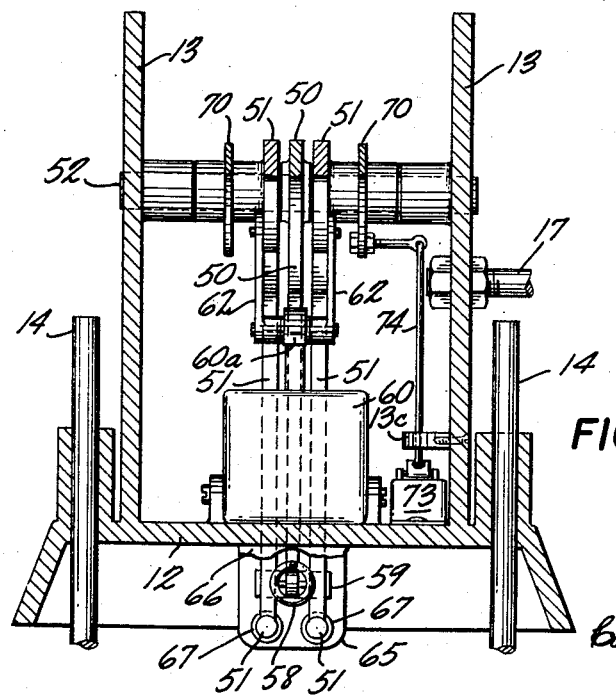
Fig. 4 is a cross-section view taken along the line 4—4 of Fig. 3 looking in the direction of the arrows.

Still referring to Fig. 3, the clockwise pivotal rotation of the levers 50, 51 to effect the downward movement of the upper and lower carriages 42, 43 is controlled by solenoids 60, 61. The solenoids 60, 61 are arranged one behind the other, and the rearwardly disposed solenoid 60 is connected by links 62 (see also Fig. 4) to the levers 51, whereas the forwardly disposed solenoid 61 is connected by means of a link 63 to the center lever 50.

In operation, the solenoids 60, 61 are adapted to be energized in sequence, first the solenoid 60 and then, if conditions warrant, the solenoid 61. The armature 60a of the solenoid 60 has a shorter stroke than the armature 61a of the solenoid 61. The operation of the solenoid 60 pivots the levers 51 in a clockwise direction (as viewed in Fig. 3) and the pivotal movement is also imparted to the center lever 50 through the horizontal yoke 59 of the vertical arm of the lever 50. As a result, in response to the operation of the solenoid 60, both the upper and lower carriages 42, 43 are simultaneously moved downwardly, the upper carriage through its full downward stroke and the lower carriage through but part of its full downward stroke, the downward movement of the upper and lower carriages pivoting the inking device 48 to inoperative position out of the way of the downward travel of the printing head 45, and causing the holding members or rods 46 to descend into firm engagement with the lid or cover of the container which will have been presented to the printing position.

Thereafter, the subsequent energization of the solenoid 61 and the operation of its armature 61a, which is connected to the central lever 50, effects the further downward movement of the lower carriage 43 to bring the printing head 45 into printing engagement wtih the lid of the container. The subsequent de-energization of the solenoids 60, 61 permits the tension spring 58 to restore the levers 50, 51 in a counterclockwise direction, as viewed in Fig. 3, thereby raising the carriages 42, 43 to their original starting positions.

As best shown in Fig. 3, the underside of the base plate 12 is formed with a pair of transverse, spacially separated walls 65, 66, the wall 65 being behind the wall 66. These walls serve to accommodate oppositely disposed, spring-urged plungers 67, 68 to cushion the extreme lower ends of the levers 51 during their operation. The extreme counterclockwise position of the center lever 50 is determined by the engagement of the yoke 59 with the levers 51, and therefore, the rearwardly disposed plungers 68 of the forward wall 66 serves also to cushion the lever 50; in addition, the rearward wall 65 contains another spring-urged plunger 69 for the lever 50 in its extreme clockwise position.

Figure 12:
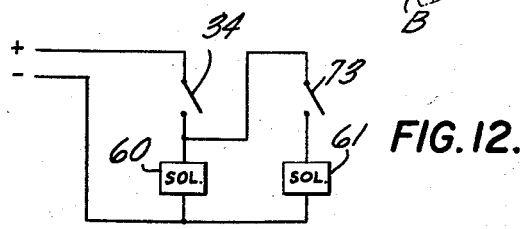
Fig. 12 is a circuit diagram for the electrical control mechanism of the present invention.

Referring to Fig. 1, the two upper carriage actuating levers 51 each support a substantially horizontally disposed lever 70 mounted adjacent thereto. The levers 70 are rotatably mounted by means of a pivot 71 at approximately the midpoints of the upper horizontal arms of the levers 51. As viewed in Fig. 3, the levers 70 are urged in a clockwise direction by springs 70a mounted from the side frames 13, and the forward ends of the levers 70 engage the upper heads 46a of the vertically slidable holding members 46. The back end of one of the levers 70 is connected by a vertical rod 74 which is guided for vertical movement in a horizontally disposed eyelet 13c of one of the side frames 13. The lower end of the rod 74 contacts the armature 73a of an electrical microswitch 73, which microswitch controls the operation of the solenoid 61 only if the microswitch 34 (see Fig. 12) is closed.

During the pivotal movement of the levers 51, as controlled by the energization of the solenoid 60, the pivots 71 of the levers 70 are translated downwardly. During the downward travel of the upper and lower carriages 42, 43, if the holding members 46 engage a lid or cover of the container, their further downward travel will cease, although the further downward movement of the lower carriage 43 will not be obstructed, since the holding members 46 are slidably carried by the lower carriage. The contact of the forward ends of the levers 70 with the upper heads 46a of the members 46 will cause the levers 70 to pivot in a counterclockwise direction (as viewed in Fig. 3) thereby closing the switch 73 to energize the solenoid 61. The energization of the solenoid 61, as explained above, will complete the downward stroke of the lower carriage 43 to bring the printing head into contact with the lid or cover of the container. If, however, the holding members 46 fail to detect a lid or cover on a container, the lower ends thereof will penetrate the substance within the container and the microswitch will remain open.

In this manner the holding members 46 also serve as cover or lid detectors. Unless they engage the surface of a lid or cover, the switch 73 will remain open and the solenoid 61 will not be energized. Unless, of course, the solenoid is energized, the printing head 45 will not complete its full downward movement to make printing contact with the lid or cover of the container.

During the printing operation upon the lid or cover of the container, the holding members 46 prevent the further movement of the container by the conveyor 10. In order to permit the conveyor to be continuously driven, even while the container is held stationary by the holding members 46, a slotted or grooved plate 80 is formed or mounted on top of the platform B (see Figs. 3 and 11). As shown in Fig. 2, the approach end of the plate 80 is inclined and the discharge end of the plate 80 is declined to permit the container to be easily carried onto or off of the top of the plate 80. Normally, the spring conveyor members 10 which comprise the conveyor are adapted to travel through the slots or grooves in the plate 80, and normally the upper portions of the conveyor members, in traveling through the grooves, project above the top surface of the plate, so that the conveyor will have sufficient frictional engagement with the container to permit the container to be transported across the surface of the plate. However, when the holding members 46 engage the cover or lid of the container, thereby firmly and securely holding it against the upper surface of the plate 80, the conveyor members will still be permitted their continuous movement through the grooves or slots in the plate 80, making slipping contact with the undersurface of the container until the container is released by the holding members.

By way of summarizing the operation of the present invention, the articles to be marked or coded may be delivered by any suitable means in single file, and without regard to spacing, to a conveyor 10. For purposes of this summary, it will be assumed that the articles are containers which have already been filled and covered by a lid. As the container is moved toward the printing position, it will engage the pivotal control arm 20, the friction of the container upon the conveyor causing the control arm to pivotally yield out of the way. This pivotal yielding movement of the control arm raises the gate 24 into operative position to intercept a succeeding container to prevent its premature advance to the printing position. The leading succeeding container, as well as any containers behind it, will be thus held in slipping relationship on the conveyor 10, while the container which has been allowed to pass is being conveyed to printing position.

When the container is in the printing position, or just before it comes to the printing position, it will release the control arm 20 permitting it to be restored by spring pressure to its starting position. During this return movement of the control arm, the pawl 31 associated with the control arm will engage a tooth of the ratchet wheel 32, rotating the ratchet wheel and the cam 33 through a predetermined arc. The cam is engaged by the cam follower 37, and the cam follower controls the operation of a microswitch 34, the arrangement being such that the microswitch will be closed for a period of time, completing the circuit to the solenoid 60. Also, during this return movement of the control arm 20 the gate 24 is dropped to permit the leading container in registration therewith to pass and to engage the control arm 20 to repeat the cycle described above.

Meanwhile the energization of the solenoid 60 pivotally operates the lever 50 and the levers 51 to cause the carriages 42, 43 to descend. As explained, the downward movement of the upper carriage through the links 49s will pivot the inking pad 48 out of the path of the downwardly moving printing head 45. The downward movement of the upper and lower carriages 42, 43 will cause the holding members 46 to engage the cover or lid of the container to prevent its further advance by the conveyor until after the printing operation. Also, as a result of the energization of the solenoid 60, the printing head 45 is carried by the lower carriage closer to the cover or lid of the container, but not in contact therewith.

If, during the pivotal operation of the levers 50, 51 as controlled by the energization of the solenoid 60, the lower ends of the holding members 46 fail to engage a lid or cover upon the container, they will penetrate the substance within the container, but the printing action will be withheld. If, however, the holding members 46 engage a lid or cover upon the container, they will cause the necessary pivotal action of one of the levers 70 to close the microswitch 73. The closing of the switch 73 energizes the solenoid 61 which completes the full downward stroke of the lower carriage 43, bringing the printing head 45 into contact with the lid or cover of the container. It is understood that the energization of the solenoids 60, 61 in sequence takes place during that period of return pivotal movement of the control arm 20, while the switch 34 is closed.

The disposition of the printing head 45 with respect to the captured container in the printing position is such that the marking or coding will be imprinted on the lid or cover of the container near the rim. This arrangement may be preferred to prevent the marking or coding from being printed over the trademark and/or any ornamental printing which may appear on the cover or lid. However, the marking or coding may, if desired, be printed at the center of the cover or lid.

The invention has been shown and described in a single and preferred form only and obviously many modifications and variations may be made therein within the spirit of the invention. For example, the present invention in its preferred form as shown and described herein comprises three units, namely, the escapement unit, the printing or marking unit and the article holding unit, each of which may be operated alone or in combination with either or both of the other units. It is to be understood, therefore, that the invention is not to be limited to any specified form or embodiment, except in so far as such limitations are set forth in the claims.

I claim:

1. In a machine for marking articles, the combination of marking means, actuating means for moving the marking means toward an article in printing position, a moving conveyor for transporting the articles to be marked to the marking means, a pivotal control member interposed in the path of travel of the article on the conveyor, the engagement of said article with the control member pivoting the latter through a given arc out of the path of travel of the article, means to return the pivotal control arm to its starting position to engage a subsequent article, a stop interposed in the path of travel of the article transported by the conveyor for arresting the succeeding article in a waiting position while the control arm is pivoted out of the path by the preceding article, means controlled by the control member for controlling the operation of the actuating means, and means controlled by the return movement of the control member for moving the stop to release position, permitting the conveyor to advance the article in waiting position to the marking means.

2. In a machine for marking articles, the combination of marking means, means for moving the marking means toward an article in printing position, a moving conveyor to transport the articles to be marked to the marking means, means interposed in the path of travel of said article by the conveyor for controlling the operation of said means for moving the marking means toward an article in printing position, means movable into engagement with an article on the conveyor in marking position, means controlled by said means interposed in the path of travel of said article to control the operation of the article engaging means, and means controlled by the movement of the article engaging means beyond a predetermined limit for preventing the marking means from completing its movement.

3. In a machine for marking articles as set forth in claim 2 characterized in that the article engaging means serves to detect the absence of a cover on the article.

4. In a machine for marking articles as set forth in claim 2 wherein the conveyor comprises a plurality of continuously driven flexible elements and wherein the combination also includes a platform upon which an article is supported in position for marking, said platform having slots therein which are sufficiently deep to permit the driven flexible elements to be depressed therein below the upper surface of the platform, thereby permitting the flexible elements of the conveyor to make slipping contact with the underside of the article, and guide means at both ends of each slot to normally maintain the flexible elements raised above the upper surface of the platform, thereby to advance an article across the platform unless the article is pressed against the upper surface thereof.

5. In a machine for marking articles, the combination of marking means, actuating means therefor, a moving conveyor for transporting the articles to be marked to the marking means, a pivotal control member interposed in the path of travel of the article transported by the conveyor, the engagement of said article with the control member pivoting the latter through a given arc out of the path of travel of the article, a gate operable to intercept a succeeding article and to maintain it in registration therewith, means to return the pivotal control member to its starting position, and means controlled by said return movement of the pivotal control member to condition for operation the actuating means for the marking means, the operation of said pivotal member in one direction controlling the operation of the gate to article intercepting position and the movement of the pivotal member in the opposite direction controlling the operation of the gate to release position to permit the conveyor to advance the article in registration with the gate toward the position for marking.

6. In a machine for marking articles as set forth in claim 5 wherein the pivotal control member and the gate are mechanically connected by means of a gear and rack arrangement.

7. In a machine for marking the covers of containers, the combination of marking means, container detecting means, cover detecting means movable into contact with the cover of the container following the detection of a container by said container detecting means, and means for actuating the marking means and bringing it into contact with the cover only if a container is detected by said container detecting means and a cover is detected by said cover detecting means.

8. In a machine as set forth in claim 7 characterized in that said cover detecting means firmly holds the container during the marking operation.

9. In a machine for marking articles, the combination of marking means, actuating means therefor, a moving conveyor for transporting the articles to be marked to the marking means, a pivotal control member interposed in the path of travel of the article on the conveyor, the engagement of said article with the control member pivoting the latter through a given arc out of the path of travel of the article, means to return the pivotal control arm to its starting position to engage a subsequent container, holding means movable into contact with an article in the marking position to firmly engage the article during the marking operation, a cam rotatable by the return movement of the control member to control the operation of the holding means, means controlled by the engagement of the holding means with the article to actuate the marking means, a ratchet wheel for operating the cam, and a pawl associated with the control member, the pawl making slipping contact with the ratchet wheel during the pivotal movement of the control member and effecting the rotation of said ratchet wheel and cam during the return stroke thereof.

10. In a machine for marking articles, the combination of marking means, actuating means therefor, a moving conveyor for delivering articles to the marking means, escapement means for insuring adequate spacing between the articles, article holding means movable into engagement with an article before the marking operation, an electrical solenoid for moving the article holding means into engagement with an article in the marking position, an electrical circuit controlled by the escapement means for operating said solenoid, an electrical solenoid to actuate the marking means, and an electrical circuit controlled by the engagement of the holding means with the article to be marked for operating said second-mentioned solenoid.

11. In a machine for marking articles, the combination of a frame, a carriage movable in said frame, a type holder carried by said carriage, an inking pad pivotally mounted in said frame, at least two article holding members carried by said carriage, a first operating lever serving to move the carriage through part of its complete travel toward the article to be marked, thereby bringing the article holding members into engagement with the article, and serving also to pivot the inking pad out of the path of travel of the type holder, a second operating lever for completing the travel of the carriage toward the article to be marked, a first solenoid for operating the first of said levers, and a second solenoid for operating the second of said levers, whereby the face of the type is moved into printing contact with the article to be marked.

12. In a machine for marking articles, the combination as set forth in claim 11 including a conveyor for delivering the articles to the position for marking, escapement means for insuring adequate spacing between the articles, and means controlled by the escapement means for operating the first-mentioned solenoid.

13. In a machine for marking articles, the combination as set forth in claim 11 including means controlled by the engagement of the holding members with the article to be marked to operate the second-mentioned solenoid.

14. In a machine for marking articles, the combination as set forth in claim 11 characterized in that the holding means serves to detect the presence of a cover upon a container.

15. In a machine for marking the covers of containers, the combination of a frame, a carriage movable in said frame, a type holder carried by said carriage carrying typographical characters representing indicia to be marked on the cover of a container, a detector member carried by, but movable relative to the carriage, means for moving said carriage toward a container in position for marking, permitting the said member to engage the cover of the container, means controlled by the relative movement of said member with respect to the carriage for further moving the carriage to carry the printing type into printing contact with the cover of the container, a first solenoid, means controlled by the delivery of a container to marking position for operating the first solenoid, an actuating member controlled by said solenoid to impart initial movement to the carriage to permit the slidable member to be moved into contact with the cover of the container, a second solenoid, a switch for controlling the operation of said second solenoid, a member pivotally mounted to said actuating member to transmit the slidable movement of the slidable member with respect to the carriage to operate said switch, thereby operating the second solenoid, and means controlled by the operation of the second solenoid to impart further movement to the carriage through said actuating member to complete the operative movement of the carriage, thereby bringing the printing type into contact with the cover of the container.

16. In a machine for marking articles, the combination of marking means, actuating means therefor, a moving conveyor for transporting the articles to be marked to the marking means, a pivotal control member interposed in the path of travel of the article on the conveyor, the engagement of said article with the control member pivoting the latter through an arc out of the path of travel of the article, means to return the pivotal control arm to its starting position to engage a subsequent container, a cam operable by the return movement of the control member to initiate an operation associated with the actuation of the marking means, a ratchet wheel and a pawl for operating the cam, the pawl making slipping contact with the ratchet wheel during the forward pivotal movement of the control member, but engaging the ratchet wheel during the return stroke thereof, and adjustable means associated with the ratchet wheel for determining the point at which the pawl engages the ratchet wheel, so that the rotation imparted to the cam will be independent of the arc through which the control member is moved.

17. A combination as set forth in claim 16 wherein said adjustable means comprises a notched collar adjustably mounted in relation to the ratchet wheel, the adjusted position of the operative notch of said collar determining the point at which the pawl engages the ratchet wheel.

18. In a machine for marking the lids of filled containers, marking means, a movable carriage for supporting the marking means, container detecting means, means controlled by the container detecting means to control the operation of the carriage, the carriage being thereby moved a part of the distance toward the article to be marked, and lid detecting means movable into engagement with the lid of the filled container to be marked, the said movement of the lid detecting means being controlled by the container detecting means, the lid detecting means determining whether the carriage completes its operation to bring the marking means into marking engagement with the lid, so as to prevent the marking means from coming into contact with the contents of the container.

19. The combination set forth in claim 18 wherein the lid detecting means comprises at least one spring urged rod carried by but relatively movable in relation to the carriage.

20. In a machine for marking the lids of containers, marking means, lid detecting means, a movable carriage for supporting said marking means and said lid detecting means, actuating means for moving the carriage to carry the marking means and the lid detecting means toward a container, and container detecting means for initiating the movement of said carriage toward the container to bring the lid detecting means into engagement with a lid, said lid detecting means determining whether the carriage continues its movement toward the lid to bring the marking means into contact therewith.

21. The combination set forth in claim 20 including an inking pad, a movable support for said inking pad, and means controlled by the carriage for imparting movement to the support, whereby the inking pad is moved into inking contact with the marking means when the carriage is positioned remotely from the operative or marking position and out of contact with the marking means when the carriage is moved toward the operative or marking position.

22. In a machine for marking the lids of filled containers, a movable carriage, guideways for said carriage, whereby the carriage is movable toward and away from a container in position to be marked, a pivotal lever for controlling the operation of said movable carriage, electrical solenoid means for imparting movement to said pivotal lever, a spring urged lid detecting rod carried by said carriage but being relatively movable to said carriage, container detecting means, switch means actuated by said container detecting means, an electrical circuit for controlling the operation of said electrical solenoid means to impart movement to the pivotal lever and move the carriage toward said container when a container is detected by said container detecting means, and means controlled by said lid detecting rod for determining whether or not the carriage completes its movement toward the container depending on whether the lid detecting rod detects or fails to detect a lid on the container.

23. A machine for marking the lids of filled containers including marking means engageable with the lid of a container delivered thereto, actuating means for imparting motion to the marking means to bring the marking means into engagement with the lid of a container delivered thereto, and lid engaging means operable to prevent the movement of the marking means into contact with the contents of the container when the lid engaging means fails to detect a lid on the container.

24. A machine for marking the lids of containers comprising marking means, a conveyor for delivering containers to the marking means, a carriage for transporting the marking means toward and away from a container, lid detecting means resiliently carried by the carriage, and means controlled by the failure of the lid detecting means to engage a lid on the container during the downward movement of the carriage to interrupt the further downward movement of the carriage.

25. A machine as set forth in claim 24, including container detecting means interposed in the path of travel of the article on the conveyor to detect the presence of a container and means controlled by the container detecting means to control the operation of said carriage.

26. A machine as set forth in claim 24, including escapement means for insuring adequate spacing between containers on the conveyor and means controlled by said escapement means to move the carriage toward the conveyor to bring the lid detecting means into engagement with the container.

27. A machine as set forth in claim 24, including a solenoid operated lever for imparting movement to the carriage.

28. A machine as set forth in claim 24, including a solenoid operated lever for imparting initial movement to the carriage, and another solenoid operated lever for completing the movement of the carriage to bring the marking means into operative contact with the lid of the container.

29. A machine for marking the lids of containers comprising marking means, a conveyor for delivering containers to the marking means, a support for transporting the marking means toward and away from a container, resiliently mounted lid detecting means, means for moving the lid detecting means into engagement with the lid of a container, and means controlled by the failure of the lid detecting means to engage a lid on the container to prevent the marking means from coming into contact with the contents of the container.

References Cited in the file of this patent

UNITED STATES PATENTS

| | | |
|---|---|---|
| 472,497 | Groth | Apr. 5, 1892 |
| 930,146 | Brooks | Aug. 3, 1909 |
| 1,219,383 | Ellis | Mar. 13, 1917 |
| 1,411,011 | Gebhardt | Mar. 28, 1922 |
| 1,504,686 | Goldberg | Aug. 12, 1924 |
| 1,590,905 | Rettmer | June 29, 1926 |
| 1,618,845 | Rice et al. | Feb. 22, 1927 |
| 1,741,752 | Amory | Dec. 31, 1929 |
| 1,845,726 | Scott | Feb. 16, 1932 |
| 1,855,767 | Neuman | Apr. 26, 1932 |
| 2,085,325 | Miller | June 29, 1937 |
| 2,335,840 | Hebenstreit | Nov. 30, 1943 |
| 2,424,006 | Verrinder | July 15, 1947 |
| 2,499,564 | Binsack | Mar. 7, 1950 |
| 2,517,868 | Goodwin | Aug. 8, 1950 |
| 2,567,232 | Nordquist et al. | Sept. 11, 1951 |
| 2,603,150 | Klug | July 15, 1952 |
| 2,654,312 | Phipps | Oct. 6, 1953 |
| 2,740,351 | Anderson | Apr. 3, 1956 |